March 19, 1957
R. B. HINCKLEY
2,785,536
DELIVERY TUBE FOR LIQUEFIED GASES
Filed Nov. 3, 1953
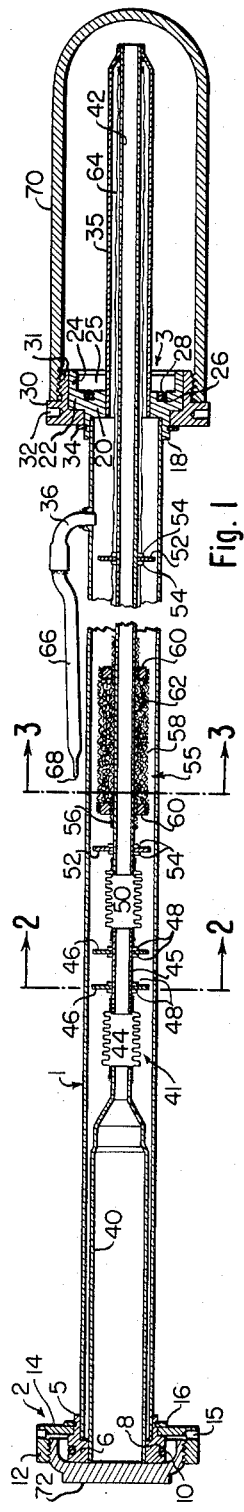
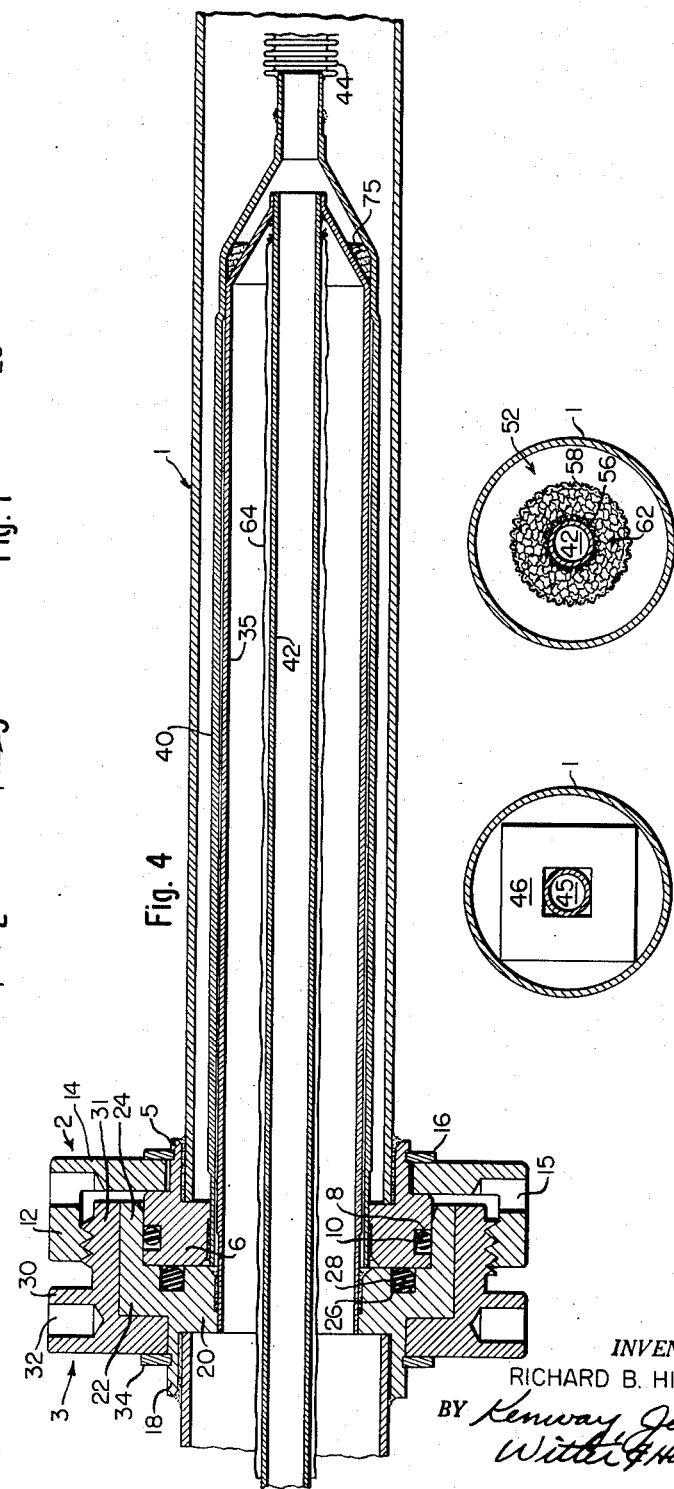
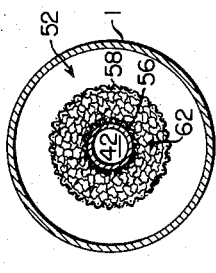
*INVENTOR.*
RICHARD B. HINCKLEY
BY
ATTORNEYS

United States Patent Office 2,785,536
Patented Mar. 19, 1957

2,785,536

DELIVERY TUBE FOR LIQUEFIED GASES

Richard B. Hinckley, Dorchester, Mass., assignor to Arthur D. Little, Inc., Cambridge, Mass., a corporation of Massachusetts Application November 3, 1953, Serial No. 390,041

8 Claims. (Cl. 62—1)

In conducting liquefied gases either from the production apparatus or other source of supply to storage flasks or receptacles, it is necessary to maintain the gas at low temperatures, ranging from a few degrees below 0° F. to approximately 300° below zero in the case of liquefied oxygen, and lower temperatures in the case of hydrogen, nitrogen and other gases. Hence, special precautions must be taken in order to avoid considerable losses due to evaporation and, in the case of liquid hydrogen and oxygen, hazards such as possible combustion and explosion. It is, therefore, necessary that the delivery or transfer tube not only be strong and durable, but also that its design and construction be such that heat leakage from the ambient atmosphere to the liquefied gas be kept at a minimum.

The principal objects of the present invention are to provide a delivery tube which not only meets the aforementioned requirements, but which can be economically mass produced in various sizes and shapes, and to provide a delivery tube which is readily portable and sufficiently rigid to be easily handled, and which may be readily coupled to one or more like delivery tubes so as to form a tube of desired length without danger of loosening the connections and without appreciable increase in heat leakage.

Further objects relate to various features of construction and will be apparent from a consideration of the following description and the accompanying drawings, wherein:

Fig. 1 is an axial section showing a delivery tube constructed in accordance with the present invention;

Fig. 2 is a section on the line 2—2 of Fig. 1;

Fig. 3 is a section on the line 3—3 of Fig. 1; and

Fig. 4 is an enlarged section similar to Fig. 1, but showing the manner in which the delivery end of one tube is coupled to the receiving end of a companion tube.

The embodiment herein shown for the purpose of illustration is designed to be connected with a suitable source of liquefied gas such, for example as the refrigeration system shown in U. S. Patent 2,458,894, granted January 11, 1949, or the oxygen producing apparatus shown in U. S. Patent No. 2,640,332, granted June 2, 1953, and comprises an outer tube or member 1, preferably of copper or the like suitable material, the receiving end of which carries a female union member or coupling 2 and the opposite or delivery end carries a male coupling 3.

The female coupling 2 comprises an inner member having a neck portion 5 brazed to the end of the outer tube 1 and an adjoining shoulder 6, the periphery of which is formed with a groove 8 which receives a sealing ring 10 of a relatively inert resilient material such as neoprene or the like synthetic rubber, the depth of the groove and size of the sealing ring being such that its outer peripheral portion projects slightly beyond the surface of the shoulder. An outer member is formed with an interiorly threaded annular flange 12 which surrounds in spaced relation the shoulder 6 and an inwardly directed flange 14 which embraces the neck 5 so as to be rotatable thereon. The periphery of the flange 12 is formed with circumferentially spaced openings 15 to receive the tooth or lug of a spanner wrench and the inner and outer members are held in position by a snap ring 16 disposed in a circumferential groove in the neck 5.

The male coupling 3 comprises an inner member having a neck 18 brazed to the delivery end of the outer tube, the neck 18 adjoining an inner annular shoulder 20 and an outer annular shoulder 22 integral with a peripheral flange 24 which defines an annular recess 25 (Fig. 1) designed snugly to receive the shoulder 6 of a companion female coupling. The inner or bottom wall of the recess 25 is formed with a circular groove 26 in which is disposed a second sealing ring 28, the outer periphery of which projects slightly beyond the bottom wall of the recess. An outer member is formed with stepped peripheral flanges 30 and 31 which embrace the shoulder 22 and flange 24 so as to rotate thereon, the flange 30 being provided with spaced opening 32 to receive the lug of a spanner wrench and the flange 31 being exteriorly threaded to engage the flange 12 of the female coupling. The inner and outer members are also held in position by a snap ring 34 disposed in a circumferential groove in the neck 18.

The delivery end of the outer tube 1 includes an extension 35 which is preferably of stainless steel, and the inner end of this extension is brazed to the inner periphery of the shoulder 20. Between its ends the outer tube 1 is formed with an opening connected to an exhaust tube 36, the utility of which is hereinafter pointed out. Mounted within the outer tube 1 and its extension 35 is an inner tube for conducting the liquefied gas, which comprises a receiving end section 40, an intermediate section 41 and a delivery end section 42. The outer end of the section 40 is brazed to the opening in the annular shoulder 6 and this section is similar to but very slightly larger than the extension 35 so that the extension of a companion tube has a tight sliding fit therein when the tubes are coupled as shown in Fig. 4.

The inner end of the section 40 is tapered so as to fit within one end of a Phosphor bronze bellows 44 constituting a part of the intermediate section 41 and the other end of the bellows fits about one end of a short length of stainless steel tubing 45, the parts being soldered together. The tube 45 and associated parts are centered within the outer tube by a plurality of Micarta spacers 46 (Figs. 1 and 2) which are preferably square or non-circular shaped, having a diagonal length or major dimension slightly less than the internal diameter of the outer tube so as to contact the latter at only a few points, thereby providing a path of minimum conductivity between the inner and outer tubes. The spacers are held in position by snap rings 48 (Fig. 1).

The intermediate section 41 also comprises one or more bellows 50, depending on the length of the section, interconnecting the tube 45 and the inner end of the stainless steel tube 42 which constitutes the delivery-end section. The inner end and central portion of the tube 42 carry a plurality of spacers 52 conforming structurally and functionally to the spacers 46, the spacers 52 being held in position by snap rings 54. By installing a bellows as an integral part of the inner tube, the contraction of the latter which is at low temperatures is taken up by the expansion or extension of the bellows. Since the outer tube 1 will be at or near ambient temperatures, the length of any section of the tube of the overall assembly has a minimum contraction, i. e., the outer tube, which is warm, maintains the length while the bellows in the inner tube allows contraction of the cold portion of the assembly without building up undue stresses in any joint.

The outer end of the section 42 is welded to the reduced end of the extension 35, and between the intermediate section 41 and the coupling 3, the section 42 carries a cartridge like adsorbent trap 55 (Figs. 1 and 3). This trap comprises an inner fine mesh screen cylinder 56 and an outer screen cylinder 58 secured to annular closures 60 (Fig. 1), the cylinders 56 and 58 defining an elongate annular chamber which receives charcoal or the like adsorbent material 62.

The section 42, except for the bellows and charcoal trap may be wrapped with one or more layers of aluminum foil 64 (Fig. 1) which provides a radiation shield effective to reduce heat leakage without the necessity of highly polishing the outer surface of the inner tube. The elongate annular chamber defined by the inner and outer tubes is evacuated through the exhaust tube 36 which is soldered to a copper seal-off tube 66 having a pre-tinned inner wall and made long enough to permit the delivery tube to be pumped and sealed several times before replacing the seal-off tube.

A high vacuum is obtained by pumping out the tube at an elevated temperature, which tends to drive off any impurities previously adsorbed on the charcoal and metal surface, and while still warm the tubes 66 (Fig. 1) is sealed by compressing its end portion and applying sufficient heat thereto to fuse its pre-tinned interior. After cooling, the compressed end 68 is cut off and a dab of solder applied therein. When not in use the delivery end of the tube is protected by a removable plastic shield 70 (Fig. 1) and the receiving end is likewise protected by a removable cap 72.

A delivery tube constructed as above described may be built in various sizes, lengths and shapes so as to meet the requirements of a given situation, and two or more lengths may be coupled as shown in Fig. 4, in which case the tapered end portion of the tube 35 may be provided with a felt gasket 75 which prevents leakage at this junction. This construction and arrangement is particularly advantageous in that the protected ring 28 seals against the relatively unprotected surface of the shoulder 6 and the unprotected ring 10 seals against the protected surface of flange 24. Hence, the combination of the two sealing rings will prevent leakage even when the contacting surfaces are slightly marred or the rings are slightly damaged. Furthermore, when several tubes are connected end-to-end in an installation, if the vacuum is lost in one of the tubes, it is not necessary to remove and replace the entire installation, but only the damaged one. It is to be understood that when in use the coupling 2 is attached to a male coupling at the delivery point of the producing apparatus or storage receptacle, which preferably conforms to the construction of the male coupling 3, thereby attaining the aforementioned advantages illustrated in Fig. 4.

While I have shown and described one embodiment of the invention it is to be understood that various changes and modifications may be made without departing from the spirit and scope of the invention as set forth in the appended claims.

I claim:

1. A delivery tube for liquefied gas comprising an elongate outer tubular member having at one end a coupling for attachment to a supply of liquefied gas; an inner tubular member disposed within said outer tubular member so as to define therewith an elongate annular chamber; said inner tubular member having a receiving end section sealed to said coupling, a delivery end section sealed to the delivery end of said outer tubular member and an intermediate section including a bellows permitting expansion and contraction of the inner tubular member relative to said outer tubular member; and a cartridge-like member containing adsorbent material carried by and in thermal contact with one of the sections of said inner tubular member, said annular chamber being evacuated.

2. A delivery tube as set forth in claim 1, wherein a plurality of spacers hold said intermediate section in substantially coaxial relation to said outer tubular member.

3. A delivery tube as set forth in claim 1, wherein a radiation shield surrounds a part of the inner tubular member.

4. A delivery tube for liquefied gas comprising an elongate outer tubular member having coupling members at opposite ends and an extension projecting beyond the coupling member at its delivery end; an inner tubular member disposed within said outer tubular member and extension so as to define therewith an elongate annular chamber; said inner tubular member having a receiving end section sealed to the coupling member at the corresponding end of said outer tubular member, said receiving end section being shaped to receive the extension of a companion delivery tube, a delivery end section sealed to the free end of said extension, and an intermediate section including a bellows permitting expansion and contraction of said inner tubular member relative to said outer tubular member; and a cartridge-like member containing adsorbent material carried by and in thermal contact with one of the sections of said inner tubular member, said annular chamber being evacuated.

5. A delivery tube as set forth in claim 4, wherein said coupling members consist of male and female elements interengageable with identical female and male elements of the coupling members of a companion delivery tube.

6. A delivery tube as set forth in claim 4, wherein said coupling members consist of male and female elements interengageable with identical female and male elements of the coupling members of a companion delivery tube, the male element having an annular recess, the inner wall of which is formed with an annular groove in which is disposed a sealing ring, and the female element having an internal annular shoulder formed with a peripheral groove in which is disposed a sealing ring, the annular shoulder of the female element being shaped to fit the annular recess of the male element so that the contiguous wall portions of the recess and shoulder cooperate to compress the sealing rings, thereby to form a fluid-tight seal.

7. In apparatus of the class described, a union consisting essentially of male and female elements; the male element comprising an inner member having a neck integral with an enlarged cup-like portion defining an annular recess, the bottom of said cup-like portion having an annular groove in which is disposed a sealing ring, and an outer member embracing the inner member and being rotatable relative thereto; the female element comprising an inner member having a neck integral with an annular shoulder having a peripheral groove in which is disposed a sealing ring, and an outer member having a peripheral flange surrounding in spaced relation said shoulder and integral with an annular flange embracing said neck, the outer member being rotatable relative to the inner member; the peripheral flange of said female element and the outer member of said male element having interengageable parts for coupling them together, the annular shoulder of said female element being shaped to fit the recess of said male element when the parts are coupled so that the contiguous wall portions of the inner members cooperate to compress the sealing rings, thereby to provide a fluid-tight joint; and an interchangeable protective cap having a peripheral flange formed with parts interengageable with the peripheral flange of the female element when the male and female elements are uncoupled.

8. In apparatus of the class described, a union consisting essentially of male and female elements; the male element comprising an inner member having a neck integral with an enlarged cup-like portion defining an annular recess, the bottom wall of said cup-like portion having an annular groove in which is disposed a sealing ring, and an outer member embracing the inner member and being rotatable relative thereto; the female element comprising an inner member having a neck integral with an annular shoulder having a peripheral groove in which is disposed a sealing ring, and an outer member having a peripheral flange surrounding in spaced relation said shoulder and integral with an annular flange embracing said neck, the outer member being rotatable relative to the inner member; the peripheral flange of said female element and the outer member of said male element having interengageable parts for coupling them together, the annular shoulder of said female element being shaped to fit the recess of said male element when the parts are coupled so that the contiguous wall portions of the inner members cooperate to compress the sealing rings, thereby to provide a fluid-tight joint; and an interchangeable protective dome-like shield having an open end formed with parts interengageable with the outer member of the male element when the male and female elements are uncoupled.

References Cited in the file of this patent

UNITED STATES PATENTS

| | | |
|---|---|---|
| 1,125,642 | Blanchard | Jan. 19, 1915 |
| 2,355,871 | Kraft | Aug. 15, 1944 |
| 2,449,052 | Brown | Sept. 14, 1948 |
| 2,525,652 | Cunningham | Oct. 10, 1950 |
| 2,565,872 | Melsheimer | Aug. 28, 1951 |
| 2,568,232 | Hamer | Sept. 18, 1951 |